Sept. 10, 1929.　　　L. R. WILDER　　　1,727,848
IGNITION DEVICE
Filed April 29, 1926　　　3 Sheets-Sheet 1

Witness:

Inventor:
Laurence R. Wilder
By Cromwell Bristow Worden
Atty's

Sept. 10, 1929.     L. R. WILDER     1,727,848
IGNITION DEVICE
Filed April 29, 1926     3 Sheets-Sheet 2

Witness:

Inventor:
Laurence R. Wilder.
By
Attys.

Sept. 10, 1929.　　　L. R. WILDER　　　1,727,848
IGNITION DEVICE
Filed April 29, 1926　　3 Sheets-Sheet 3

Witness:

Inventor:
Laurence R Wilder
By
Atty's.

Patented Sept. 10, 1929.

1,727,848

UNITED STATES PATENT OFFICE.

LAURENCE R. WILDER, OF NEW YORK, N. Y., ASSIGNOR TO SCINTILLA MAGNETO COMPANY, INC., OF SIDNEY, NEW YORK, A CORPORATION OF NEW YORK.

IGNITION DEVICE.

Application filed April 29, 1926. Serial No. 105,409.

This invention has to do with the ignition of internal combustion engines of motor vehicles.

The advantages of magneto ignition for motor vehicles are quite generally recognized, and have been utilized throughout the development of the automotive industry. In the great bulk of present day automobiles however, battery and coil ignition systems are employed. Various factors have contributed to this general adoption of that form of ignition. Among such factors may be named the extended use of electrical energy in automobiles for lighting and operation of starting motors, the apparent duplication of expense resulting from the use of both magneto for ignition and battery system for other electrical power use, mechanical difficulties involved in the operation of magnetos at a desired speed relative to the engine speed, and conservation of space and weight. The ordinary battery and coil ignition arrangement are, however, subject to several serious disadvantages which do not exist with respect to magneto ignition such, for example, as the operation of the starting motor when the engine is cold and stiff occasioning a very severe drain on the battery, and causing an extreme drop in its potential, which results in weak and ineffective ignition sparking, which under many conditions is insufficient to start the engine. Magneto ignition, in conjunction with batteries for operating the starting motor, remedies this situation, and secures several other advantages. With a magneto, having a sufficiently low coming-in speed, instant ignition sparking is obtained incident to the operation of the starting motor and independently of the potential condition of the battery. However, due to the fact that the automobile manufacturers have completely adopted the battery and coil electrical systems, no provision is made in the great bulk of present day standard automobiles for the mounting or operation of the magneto. On the other hand, standardized arrangements for the mounting and operation of distributing and timing devices for high tension coil ignition are universally employed.

The principal object of the present invention is the provision of a novel ignition device in which a magneto constitutes the source of electrical energy and which may be installed in present day standard automobiles, as accessory apparatus, in substitution for the customary ignition timing and distributing device, and which may be used in such installation to secure all of the advantages of magneto ignition without curtailment of the utility of the battery system, without complication in the matter of driving connections, without requiring special space accommodations or material increase in weight.

Another object is the improvement in magneto construction in the direction of securing increased efficiency with decreased size, and compactness of construction in conjunction with durability and certainty of operation.

Another object is the obtaining of accurate and selective timing of the magneto with respect to the engine operation while maintaining the generating efficiency of the magneto at a uniformly high level.

Other and further objects of the invention will be pointed out hereinafter, indicated in the appended claims, or will be obvious to one skilled in the art upon an understanding of the present disclosure.

For the purpose of this application I have elected to disclose herein a single structural embodiment of the invention, but it is to be understood that the same is presented for the purpose of illustration only and hence is not to be accorded any interpretation which might have the effect of limiting the invention which I claim, short of its true and most comprehensive scope in the art.

In the accompanying drawing forming a part of this specification,

Figure 1:
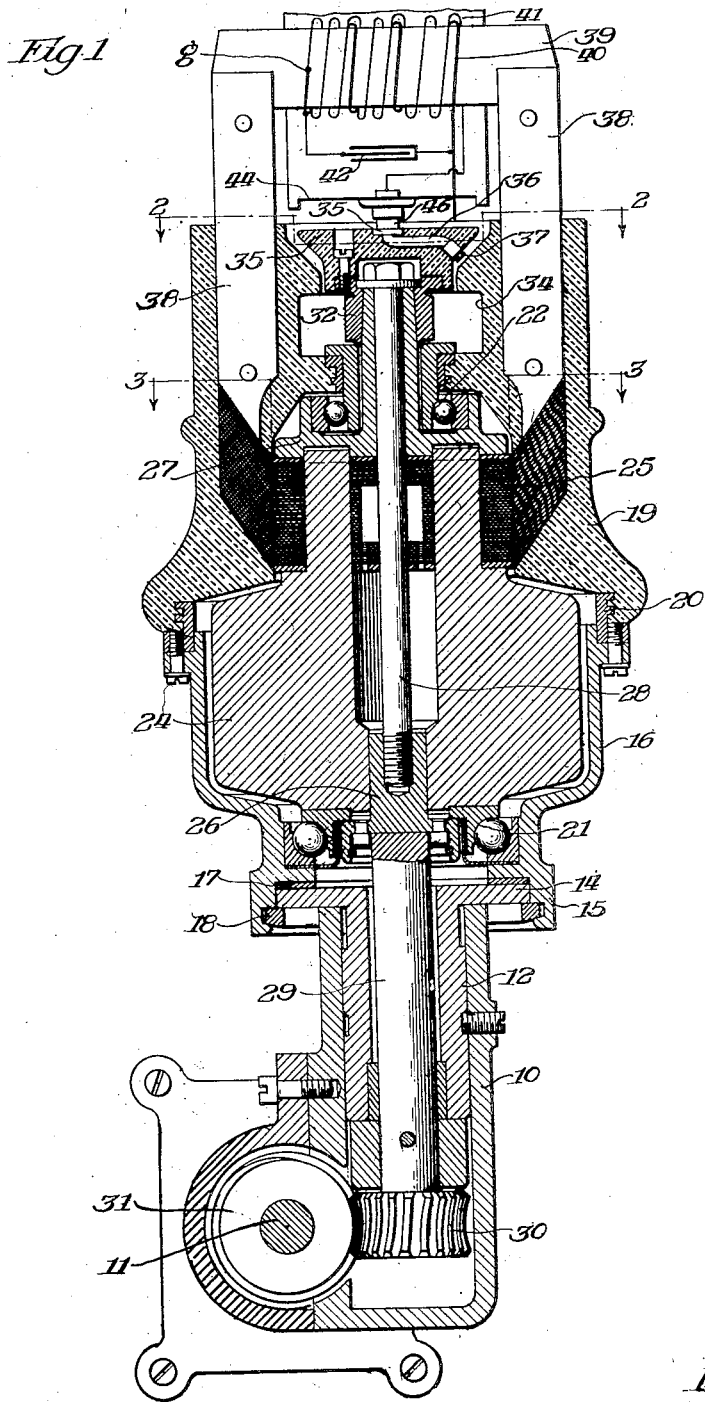
Fig. 1 is a sectional elevation of a device embodying features of the invention, same being taken on a diameter.

In conjunction with the conventional battery and coil ignition systems generally used on motor vehicles, provision is made for the mounting of a timing and distributing device on a vertical axis and in a suitable support and bearing upon the engine casing or generator frame, where it is interposed between the induction coil and the ignition plugs. The usual distributing and timing device is driven at cam-shaft speed, either from the cam shaft or from the generator shaft. Through utilization of the present invention, an instrument may be provided which may be installed in the usual S. A. E. standard mountings of the typical distributing and timing device, and operated by the usual driving connections thereof, to provide magneto ignition and accomplish the proper timing and distribution thereof to the ignition plugs. Thus a vehicle equipped with the customary generator and battery electrical system may be afforded the advantages of magneto ignition without the addition of special mounting provisions or driving connections without inappropriate utilization of space and without interference with or detriment to any of the associated apparatus.

The usual timing and distributing device is of generally cylindrical form and is mounted on a vertical axis in rather intimate relationship with the engine or the generator, usually at the end of the latter and at the side of the engine, and it is driven by a vertical shaft extending from the bottom of the device. The provision of a magneto susceptible of installation in the place of the timing and distributing device involves a considerable problem, due to the limitations as to size and arrangement which are imposed by its location as above indicated. The present invention provides an instrument which meets the requirements as to size and structural form and which possesses the efficiency requisite for effective and reliable ignition and accomplishes the proper distribution of ignition to the several ignition plugs of the engine, with provision for variation of the timing thereof with respect to the engine cycle.

The nature of the invention will be most readily understood by reference to the illustrative embodiment shown in the drawings, in which is shown a device designed for use with a four cylinder four-cycle engine. It will be understood that the reference character 10 designates a mounting having standard characteristics for the suitable retention of the distributing and timing devices customarily supplied as a part of the electrical equipment of an automobile. This is usually mounted on a portion of the generator frame or the engine casing in a selected association with a shaft 11, customarily the generator shaft or the cam shaft, by which the distributing and timing devices are driven. My device includes the mounting quill 12, which conforms to the standard characteristics of a customary timing and distributing device in that it is adapted to fit a standard mounting 10. This quill has, at its upper end, an integral disk portion 14 rotatably fitting within an annular sleeve portion 15 of the rotor casing portion 16, and secured therein between the thrust washer 17 and a snap ring 18. The casing portion 16 is preferably of circular cross section and disposed coaxially with the quill 12. At its upper extremity casing 16 supports the casing body member 19, which is made of insulating material, such as bakelite, the connection between the portions 16 and 19 being made by means of a ring 20 cast in the body portion 19 and attached to the portion 16 by screws. The body portion 19 is preferably circular in cross section and is mounted coaxially with the casing portion 16. It is formed with an axial cavity of varying width and contour for accommodation of the rotor parts. A lower ball-bearing 21 is mounted in the lower portion of the casing portion 16, and an upper ball-bearing 22 is mounted in the cavity of the body member 19. These bearings support the rotor, which includes a permanent magnet 24 of the horseshoe type, which is housed within the casing members 16 and 19 with its poles directed upwardly. In this illustrative structure the magnet has four poles, the positive and negative poles being arranged alternately about the axis of the device. North poles are designated by the symbol N and south poles by the symbol S. The poles carry laminations 25 which lie at right angles to the rotor axis, the like poles being connected by cross laminations. The magnet with its laminations is mounted between the end pieces 26 and 27 of non-magnetic material, which are clamped upon it by means of an axially-disposed screw 28, likewise of non-magnetic material. The end pieces 26 and 27 support the rotor upon the bearings 21 and 22 so that the magnet will rotate on the axis of the device. The actuating shaft 29 extends through the quill 12 and is connected at its upper end to the end-piece 26, preferably with sufficient lateral play in the connection to compensate for any misalignment of the shaft and rotor bearings. At its lower end the shaft carries a suitable gear 30 for operative engagement with a driving element 31 on the shaft 11, through the medium of which the shaft 29 will be rotated at the speed of the shaft 11. The upper end-piece 27 carries the circuit-breaker cam 32 for rotation in the circuit-breaker cavity 34 of the body portion 19, and upon the breaker cam is carried the distributer 35 disposed for rotation in association with the wall of the axial body cavity. The distributer has an axial high tension contact 35, from which a conductor 36, which is imbedded in the distributer, leads to the distributer point 37. It will be observed, therefore, that the rotor carries the distributer and the circuit-breaker cam for rotation with it on a vertical axis at cam-shaft speed.

Figure 4:
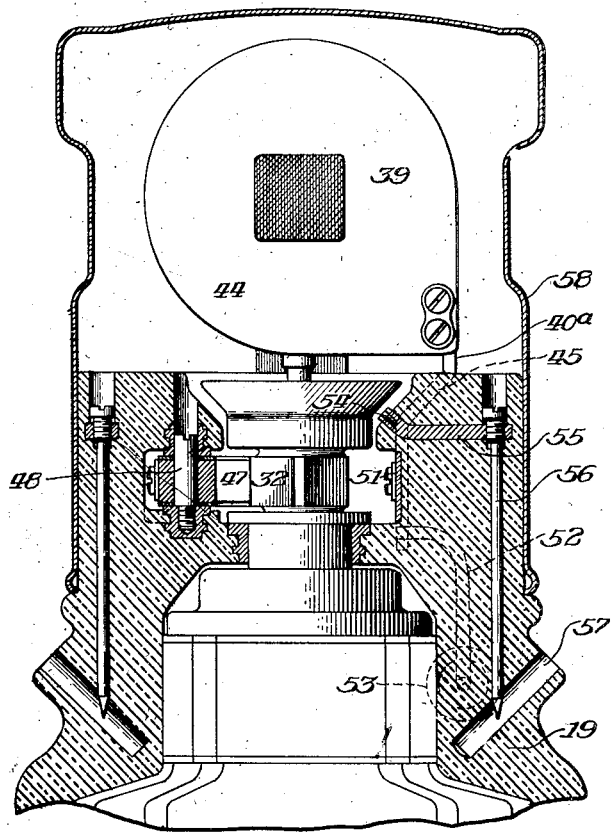
Fig. 4 is a vertical cross section taken substantially along a plane perpendicular to the section of Fig. 1.

The stator is carried on the body portion 19 of the casing and comprises elements in the form of lamination stacks 38 extending longitudinally of the rotor axis and having their lower portions moulded in the material of the body member 19. The elements 38 are connected at their upper ends by the laminated core 39, upon which is wound the primary 40 and the secondary 41 of an induction coil, which elements are diagrammatically illustrated in Fig. 1. These elements, together with a condenser 42, which is connected across the coil 40, are enclosed in a suitable envelope 44 supported above the rotor. These coils are grounded at one end, as at $g$, while the other end $40^a$ of the primary leads to a conductor 45 which is imbedded in the body member (see Figs. 2 and 4), and the other end of the secondary leads to the contact brush 46 which rides upon the high tension contact 35. Within the circuit-breaker cavity 34 of the body portion, the circuit-breaker lever 47 is mounted on its pivot 48. The circuit-breaker lever carries the movable contact 49 arranged for co-operation with the stationary contact 50 which is grounded. A spring 51 urges circuit-breaker lever 47 to close the contacts and to ride the circuit-breaker cam 32. Through the medium of this spring 51 the circuit-breaker lever is electrically connected with the imbedded conductor 45. A short-circuiting conductor 52 leads from the conductor 45 to a terminal 53, to which is attached the wire to the magneto switch which is used to short-circuit the device. The design and the mounting of the circuit-breaker lever, the spring 51 and contact 50 are such that the arrangement is reversible, so that the lever may be mounted on either side of the rotor axis, thus adapting the device for rotation in either direction. Distributed about the axis of the rotor and mounted on the body member 19 for co-operation with the movable electrode 37, are a plurality of electrodes 54 forming the distributing terminals. These are arranged at the proper angular spacing about the rotor axis for co-operation with the moving electrode 37 at the desired intervals, and are connected respectively by imbedded conductors 55 with the piercing screws 56, each of which is arranged to make electrical contact with a conductor disposed in an associated terminal seat 57 and leading therefrom to the proper ignition plug.

Figure 2:
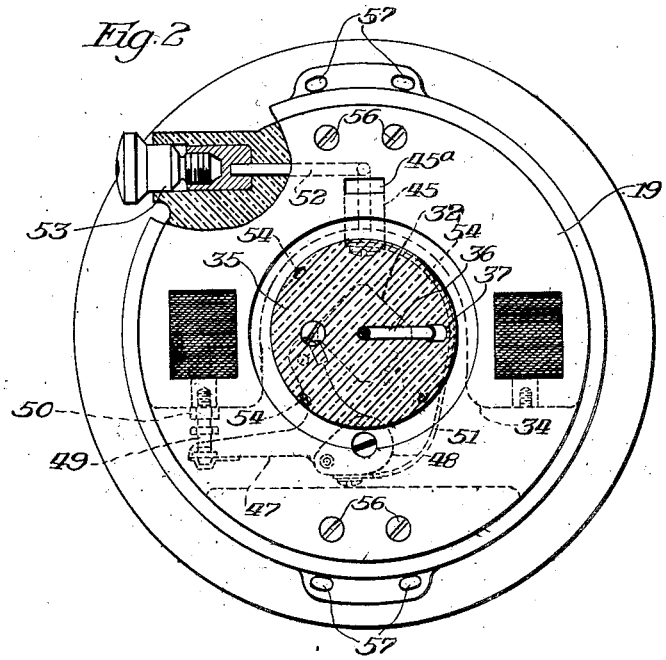
Fig. 2 is a cross section taken substantially on line 2—2 of Fig. 1.
Figure 3:
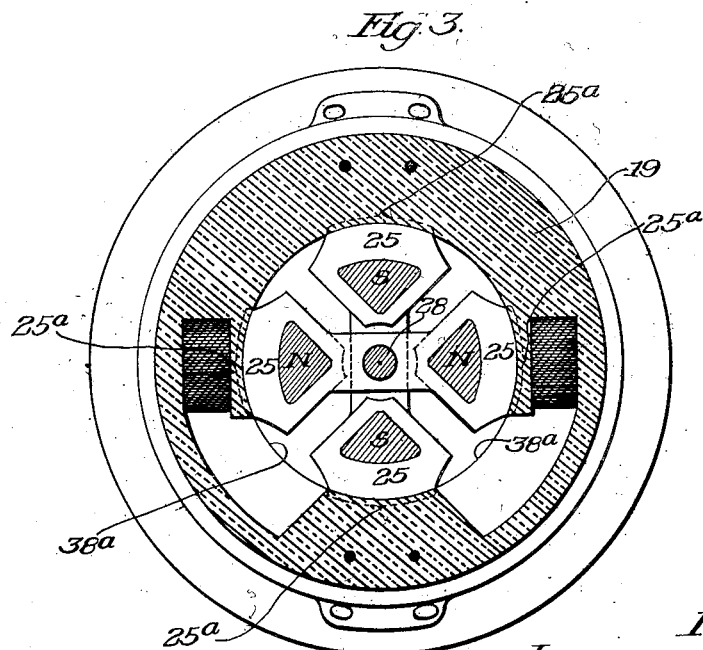
Fig. 3 is a part sectional elevation taken on a diameter approximately at right angles to Fig. 1.
Figure 5:
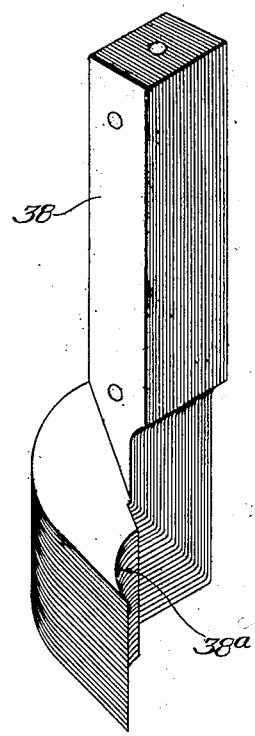
Fig. 5 is a perspective of a lamination stack.

By reference to Figs. 1, 3 and 5, it will be observed that through the major portion of the length of the elements 38 the laminations therein extend parallel to the rotor axis. In the lower portions of the elements 38, however, where imbedded in the material of the body member 19, the laminations are diverted laterally so that, where exposed in the rotor cavity, their margins are presented at right angles to the rotor axis and parallel to the margins of the rotor laminations. By a lateral deflection of the laminations the induction areas or air-gap surfaces $38^a$, thus formed by their exposed margins, may be disposed in the proper angular relationship with respect to the rotor axis to permit magnetic co-operation of one of them with a negative rotor area while the other has magnetic co-operation with a positive rotor area. In the embodiment illustrated it will be seen that the laminated rotor induction areas $25^a$ are arranged in quartering or 90° relationship and that the stator induction areas $38^a$ are separated by a like angular distance. Hence, there will be a change of flux in the stator upon movement of the rotor through each 90°. In operation of the device, the flux induced in the stator elements and the connecting core 39 by the action of the rotor magnet, incident to its rotation, induces an E. M. F. in primary coil 40, the resulting current being short-circuited through the circuit-breaking lever 47 while the contacts 49 and 50 are closed. As this current reaches its highest quantity, the cam 32, rotating with the rotor, operates the circuit-breaking lever 47 to interrupt the primary current. As a result, a high tension impulse is induced in the secondary 41 and transmitted through the brush 46 and contact 35 to the electrode 37. Incident to the rotation of the rotor, the contact 37 has at that time been brought into co-operation with one of the distributing electrodes 54, so that the discharge of coil 41 is delivered to such electrode and from it carried through the conductors 55 and 56 to the spark plug connection. It will be observed that with the rotor operating at cam-shaft speed, there will be two discharges during each revolution of the engine crank-shaft, which is the requisite number for that period of the operation of a four cylinder four-cycle engine. Upon the succeeding revolution of the engine crank-shaft, which is synchronized with the succeeding half revolution of the magneto rotor, the ignition discharges will be distributed to the two cylinders which were not fired during the preceding crank-shaft revolution. The adjustment of the timing of the magneto operation with respect to the cycles of the engine is accomplished by the rotary adjustment of the casing upon the mounting disk 14. This varies the time of the magneto discharge with respect to the engine operation, but it does not alter the generating performance of the magneto in any respect, as the relationship of the stator induction areas to the circuit-breaking lever remains the same, so that the break comes at the time of maximum flux.

By virtue of the improvements constituting my invention a magneto may be built for installation within the relatively small compass ordinarily allotted to the location of the customary timing and distributing device, and may be operated by the driving connections customarily employed for operating the latter. The warping and deflection of the stator laminations as contemplated by my invention may be accomplished in various ways, as by actual stamping of the laminations into that form, or by a sectional construction, and permits the location of the stator induction areas in the desired angular relationship with respect to the rotor axis while presenting the laminations to the rotor in a relationship effective to reduce iron losses. The warped lamination parts may be arranged with their top surfaces in horizontal position, or in a sloping position as illustrated, the latter being effective to increase the vertical extent of the induction areas formed by the exposed edges. It will be observed that by the provision of a cover 58, all operating parts are effectively housed and protected from water and dust. The installation is accomplished simply by inserting the mounting quill and the drive-shaft, equipped with a suitable gear, into the standard mounting and securing it there by means of the set-screw customarily employed for retention of a distributing and timing device, and making the necessary electrical connections between the magneto terminals and the ignition plugs of the engine.

I claim:

1. A magneto comprising a magnetic rotor mounted for operation on a vertical axis, an axial drive shaft at the bottom of the rotor, a magnetic stator having pole elements disposed on opposite sides of the rotor and extending longitudinally thereof, said stator elements being cross-connected above the rotor, and distributing and circuit-breaking devices carried by the rotor in the space between said pole elements for delivering a plurality of discharges during each revolution of the rotor.

2. A magneto comprising a casing having a mounting at its bottom, a magnetic rotor journaled on the casing for rotation on a vertical axis, a drive-shaft for the rotor extending axially through the bottom of the casing, magnetic stator elements connected above the rotor and extending longitudinally thereof in the casing for co-operation with the rotor on different sides of its axis, a circuit-breaker and a plurality of distributer electrodes mounted on the casing, and a breaker cam and distributer arm carried by the rotor between said stator elements for co-operation therewith.

3. In magneto construction, the combination with a rotor mounted for rotation on a vertical axis, of stator lamination stacks disposed at opposite sides of the rotor and having the laminations extending for the most part longitudinally of the rotor axis, the lower portions of said lamination stacks being extended circumferentially of the rotor axis and presenting the margins of the laminations for co-operation with the rotor.

4. In magneto construction, the combination with a rotor mounted for rotation on a vertical axis, of a casing member associated with the rotor and lamination stacks supported on the casing member at opposite sides of the rotor, the upper portions of said stacks extending longitudinally of the rotor axis and the lower portions of the stacks extending from said upper portions in directions circumferentially of the rotor and presenting the margins of the laminations for co-operation with the rotor.

5. In magneto construction, the combination of a casing, a rotor journaled thereon, a mounting at the bottom of the casing for supporting the same with the rotor axis vertical, laminated magnetic stator elements longitudinally disposed at opposite sides of the rotor, a core member connecting said elements above the rotor axis, and lateral extensions at the lower portion of the stator elements affording induction areas disposed for co-operation with the rotor out of alignment with the stator elements.

6. In combination with a combustion engine member having a quill mounting for receiving a quill of an ignition distributor, including a shaft for driving said distributor, and means for locking said distributor in said mounting, said distributor being determinedly rotatable in said mounting for timing the ignition with relation to the operation of said shaft, of a magneto ignition device interchangeably mountable in said mounting in place of said ignition distributor, said magneto having a quill support held within said mounting, a substantially cylindrical casing upwardly extending from said support, a shaft adapted to establish a coupling connection with said driving shaft and extending vertically through the center of said quill, a permanent magnet having a body member secured to said shaft and upwardly projecting pole members extending parallel to said shaft, magnetic laminations on said pole members horizontally mounted thereon and presenting substantially outwardly-exposed segmental pole surfaces, said pole surfaces defining a rotary surface of less diameter than the surface of said body member, a magneto armature comprising a laminated core member supported on said casing, and laminated polar extensions from said core member terminating in the pole surfaces cooperating with said arcuate pole surfaces, said core member being disposed centrally above said rotor and said polar extensions extending longitudinally parallel to said rotor axis, the pole surfaces of said polar extensions being circumferentially offset against the longitudinal axis of said extensions.

7. In combination with a combustion engine member having a quill mounting for receiving a quill of an ignition distributor, including a shaft for driving said distributor, and means for locking said distributor in said mounting, said distributor being determinedly rotatable in said mounting for timing the ignition with relation to the operation of said shaft, of a magneto ignition device interchangeably mountable in said mounting in place of said ignition distributor, said magneto having a quill support held within said mounting, a casing upwardly extending from said support, a shaft adapted to establish a coupling connection with said driving shaft and extending vertically through the center of said quill, a permanent magnet having a body member secured to said shaft and pole members, a magneto armature comprising a laminated core member supported on said casing, and laminated polar extensions from said core member terminating in pole surfaces cooperating with said magnet poles, said core member being disposed centrally above said rotor and said polar extensions extending longitudinally parallel to said rotor axis, the pole surfaces of said polar extensions being circumferentially offset against the longitudinal axis of said extensions.

8. In combination with a combustion engine member having a quill mounting for receiving a quill of an ignition distributor, including a shaft for driving said distributor, and means for locking said distributor in said mounting, said distributor being determinedly rotatable in said mounting for timing the ignition with relation to the operation of said shaft, of a magneto ignition device interchangeably mountable in said mounting in place of said ignition distributor, said magneto having a quill support held within said mounting, a casing upwardly extending from said support and rotatable therein, a shaft adapted to establish a coupling connection with said driving shaft and extending vertically through the center of said quill, a permanent magnet having a body member secured to said shaft and pole members, a magneto armature comprising a laminated core member supported on said casing, laminated polar extensions from said core member terminating in pole surfaces cooperating with said magnet poles, said core member being disposed centrally above said rotor and said polar extensions extending longitudinally parallel to said rotor axis, the pole surfaces of said polar extensions being circumferentially offset against the longitudinal axis of said extensions, and a breaker and discharge distributor on said rotor.

In testimony whereof I have hereunto signed my name.

LAURENCE R. WILDER.